United States Patent
Gao et al.

(10) Patent No.: US 10,185,078 B2
(45) Date of Patent: Jan. 22, 2019

(54) BACKLIGHT MODULE AND DISPLAY DEVICE

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Jianbin Gao, Beijing (CN); Xianlei Meng, Beijing (CN); Huijun Li, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/914,161

(22) PCT Filed: Sep. 8, 2015

(86) PCT No.: PCT/CN2015/089142
§ 371 (c)(1),
(2) Date: Feb. 24, 2016

(87) PCT Pub. No.: WO2016/127636
PCT Pub. Date: Aug. 18, 2016

(65) Prior Publication Data
US 2016/0356951 A1    Dec. 8, 2016

(30) Foreign Application Priority Data

Feb. 10, 2015  (CN) .................. 2015 2 0094859 U

(51) Int. Cl.
*F21V 7/04* (2006.01)
*F21V 8/00* (2006.01)

(52) U.S. Cl.
CPC ......... *G02B 6/0088* (2013.01); *G02B 6/0055* (2013.01)

(58) Field of Classification Search
CPC ....... G02B 6/0088; G02B 6/0055; F21S 8/00; F21V 15/00
(Continued)

(56) References Cited

U.S. PATENT DOCUMENTS 7,758,231 B2* 7/2010 Kang .................. G02B 6/0088
349/58
8,587,744 B2* 11/2013 Shin .................. G02F 1/133308
349/58

(Continued)

FOREIGN PATENT DOCUMENTS

CN      101165566 A      4/2008
CN      102943973 A      2/2013

(Continued)

OTHER PUBLICATIONS

Machine English Language Translation of CN103471042A Dec. 25, 2013.*

(Continued)

*Primary Examiner* — Anh Mai
*Assistant Examiner* — Glenn Zimmerman
(74) *Attorney, Agent, or Firm* — Ladas & Parry LLP

(57) ABSTRACT

A backlight module and a display device are provided. The backlight module includes a back plate, a reflector plate provided on a bottom surface of the back plate, and a spacer provided between the bottom surface of the back plate and the reflector plate and configured to keep a certain spacing between the bottom surface of the back plate and the reflector plate. The display device includes the backlight module. The display device has improved display quality.

15 Claims, 5 Drawing Sheets

(58) Field of Classification Search
USPC .... 362/606, 632, 633, 634, 97.1, 97.2, 97.3, 362/97.4
See application file for complete search history.

(56) References Cited

U.S. PATENT DOCUMENTS

| | | |
|---|---|---|
| 8,833,955 B2* | 9/2014 | Fang .................... G02B 6/0068 362/330 |
| 2008/0013337 A1 | 1/2008 | Lien |
| 2008/0094830 A1* | 4/2008 | Chang ............... G02F 1/133608 362/235 |
| 2010/0085502 A1* | 4/2010 | Yen .................... G02F 1/133608 349/58 |
| 2010/0149789 A1* | 6/2010 | Arai .................. G02F 1/133604 362/97.2 |
| 2010/0265738 A1* | 10/2010 | Lin ..................... G02B 6/0031 362/609 |
| 2012/0092584 A1* | 4/2012 | Jung .................... G02B 6/009 349/58 |
| 2013/0044515 A1 | 2/2013 | Lu Feng et al. |
| 2013/0100374 A1* | 4/2013 | Kang .................. G02B 6/0085 349/58 |
| 2013/0329427 A1* | 12/2013 | Pavao .................... H05K 1/181 362/244 |
| 2014/0320747 A1* | 10/2014 | Kamada ............... G02B 6/0085 348/725 |
| 2015/0116626 A1* | 4/2015 | Yu ........................ G02B 6/0073 349/58 |
| 2015/0212261 A1* | 7/2015 | Masuda ............ G02F 1/133308 348/794 |

FOREIGN PATENT DOCUMENTS

| | | |
|---|---|---|
| CN | 103471042 A | 12/2013 |
| CN | 103529596 A | 1/2014 |
| CN | 204372713 U | 6/2015 |
| KR | 20060119397 A * | 11/2006 |
| WO | WO 2014208733 A1 * | 12/2014 ........... G02B 6/0083 |

OTHER PUBLICATIONS

Machine English Language Translation of KR20060119397A Nov. 24, 2006.*

International Search Report and Written Opinion dated Nov. 17, 2015; PCT/CN2015/089142.

* cited by examiner

BACKLIGHT MODULE AND DISPLAY DEVICE

TECHNICAL FIELD

Embodiments of the present disclosure relate to a backlight module and a display device.

BACKGROUND

The liquid crystal display device has widely been used due to advantages of light weight, low power consumption, low working voltage and non-radiation and the like. The liquid crystal display device includes a display panel and a backlight module, and the display panel includes opposed substrates and a liquid crystal layer between the opposed substrates. Liquid crystal molecules in the display panel do not emit light themselves, so they need a backlight module to provide backlight for them. Therefore, the quality of the backlight module concerns the display quality of the liquid crystal display device, and it is one of the important components of a liquid crystal display device.

SUMMARY

The embodiments of the disclosure provide a backlight module and a display device.

According to at least one embodiment of the present disclosure, a backlight module is provided, which includes a back plate, a reflector plate provided on a bottom surface of the back plate, and a spacer provided between the bottom surface of the back plate and the reflector plate configured to keep a certain spacing between the bottom surface of the back plate and the reflector plate.

In an example, the reflector plate has a first surface and a second surface, and the spacer corresponds to edge region of the first surface of the reflector plate, and the first surface is a surface, of the reflector plate, facing the bottom surface of the back plate.

In an example, the spacer includes a plurality of padding blocks, and the plurality of padding blocks are spaced apart from each other and arranged in a form of annular-like trajectory along the edge region of the first surface.

In an example, the spacer is an annular-like padding block, and the annular-like padding block is provided corresponding to the edge region of the first surface.

In an example, at least one of the plurality of padding blocks are provided corresponding to the middle region of the first surface, and the rest of padding blocks are provided corresponding to the edge region of the first surface.

In an example, the bottom surface of the back plate has a reinforcement rib groove configured to reinforce strength of the bottom surface of the back plate. An opening of the reinforcement rib groove faces to the reflector plate. The spacer is provided in the reinforcement rib groove.

In an example, the bottom surface of the back plate has two reinforcement rib grooves, and the two reinforcement rib grooves are symmetrically provided along a center line of the bottom surface of the back plate. The spacer includes a plurality of padding blocks, and the plurality of padding blocks are evenly provided in the two reinforcement rib grooves.

In an example, the padding blocks are elastic padding blocks.

In an example, the spacing between the bottom surface of the back plate and the reflector plate is larger than or equal to 0.6 mm.

The embodiments of the disclosure further provide a display device, wherein the display device includes the backlight module.

BRIEF DESCRIPTION OF THE DRAWINGS

Embodiments of the present disclosure will be described in detail hereinafter in conjunction with accompanying drawings to allow one of ordinary skill in the art to understand the present disclosure more clearly, in which.

DETAILED DESCRIPTION

The technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by an ordinary skill in the art to which the present invention belongs. The terms, such as "first," "second" or the like, which are used in the description and the claims of the present application, are not intended to indicate any sequence, amount or importance, but for distinguishing various components. Also, the terms, such as "a/an," "one," "the/the" or the like, are not intended to limit the amount, but for indicating the existence of at lease one. The terms, such as "comprise/comprising," "include/including" or the like, are intended to specify that the elements or the objects stated before these terms encompass the elements or the objects and equivalents thereof listed after these terms, but not preclude other elements or objects. The terms, such as "On," "under," or the like, are only used to indicate relative position relationship, and when the position of the object which is described is changed, the relative position relationship may be changed accordingly.

Figure 1:
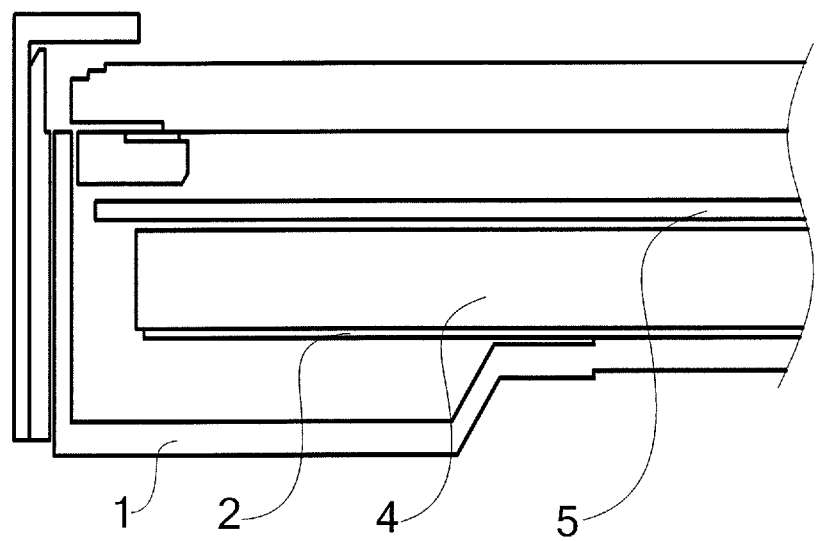
FIG. 1 is a schematic structural view of a backlight module.

A structure of a backlight module is shown in FIG. 1. The backlight module includes a back plate 1, a reflector plate 2 arranged on a bottom surface of the back plate, a light guide plate 4 arranged on the reflector plate and an optical film 5 arranged on the optical film. When the backlight module works, a light source located adjacent to the light guide plate 4 emits light, and the light passes through the reflector plate 2, the light guide plate 4 and the optical film 5, and then is converted to backlight with uniform luminance. However, when the above backlight module is vibrated, the reflector plate of the backlight module is easily scratched so that the quality of light emitted from the backlight module is affected, thereby the display quality of the liquid crystal display device is affected.

Figure 2:
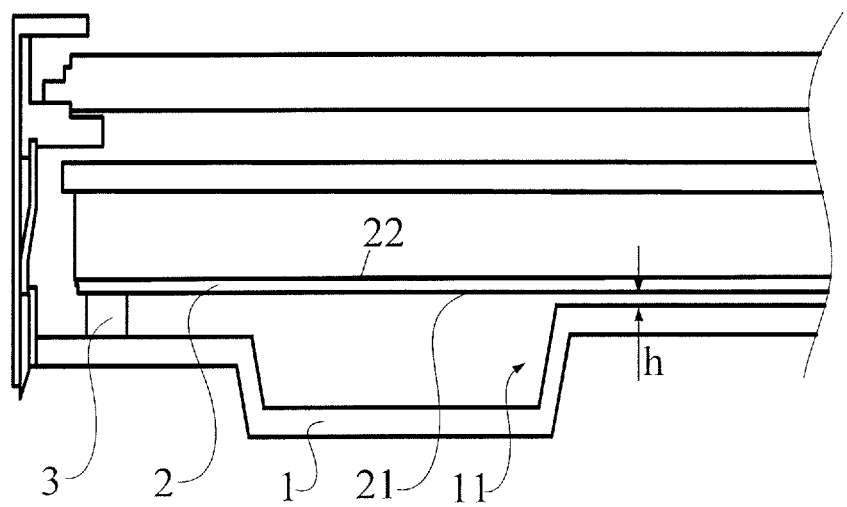
FIG. 2 is a schematic structural view of a backlight module according to an embodiment of the present disclosure.

See FIG. 2, the embodiment of the present disclosure provides a backlight module, and the backlight module includes a back plate 1, a reflector plate 2 and a spacer. The spacer includes at least one padding block 3. The reflector plate 2 is arranged on the bottom surface of the back plate 1, and the spacer (the padding block 3) is arranged between the bottom surface of the back plate 1 and the reflector plate 2 and configured to keep a certain spacing between the bottom surface of the back plate 1 and the reflector plate 2.

As can be seen, in the backlight module provided by the embodiment of the present disclosure, at least one padding block 3 is arranged between the bottom surface of the back plate 1 and the reflector plate 2 to keep a certain spacing between the bottom surface of the back plate 1 and the reflector plate 2, avoiding the reflector plate 2 contacting with the bottom surface of the back plate 1. When the above backlight module is vibrated, it would not produce mutual friction between the reflector plate 2 and the back plate 1, and the reflector plate 2 is hard to be scratched so that the quality of light emitted from the backlight module is improved.

Furthermore, at least one padding block 3 is arranged between the bottom surface of the back plate 1 and the reflector plate 2 to keep a certain spacing between the bottom surface of the back plate 1 and the reflector plate 2. When the above backlight module works, heat produced by a light source of the backlight module can not be directly transferred to the reflector plate 2 through the back plate 1, which reduces the possibility of the reflector plate 2 deformation due to heating.

Additionally, at least one padding block 3 is arranged between the bottom surface of the back plate 1 and the reflector plate 2 to keep a certain spacing between the bottom surface of the back plate 1 and the reflector plate 2. Therefore, residual dust or impurities on the reflector plate 2 will not pressed by the back plate 1 and the reflector plate 2, so it can avoid the dust or impurities scratching the reflector plate 2, and further reduce the possibility of the reflector plate 2 being scratched, and further improve the quality of light emitted from the backlight module.

In the backlight module provided by the embodiment of the present disclosure (see FIG. 2), the reflector plate 2 has a first surface 21 and a second surface 22, and the first surface 21 is a surface, of the reflector plate 2, facing the bottom surface of the back plate 1. In FIG. 2, the first surface 21 is a lower surface of the reflector plate 2. The padding block 3 corresponds to edge region of the first surface 21. The edge region of the first surface 21 is not an effective reflective area of the reflector plate 2, the region, of the reflector plate 2, contacting with the padding block 3 is not the effective reflective area of the reflector plate 2, so it can avoid that the effective reflective area of the reflector plate 2 being scratched, and further improve the quality of light emitted from the backlight module.

In the backlight module provided by the embodiment of the present disclosure, the spacer may include one or more padding blocks 3. The number, shape and arrangement mode of the padding blocks 3 can be provided or formed based on actual requirements. The following will take one padding block 3 and a plurality of padding block 3 as examples, but the number, shape and arrangement mode of the padding blocks are not limited to the listed examples. The spacer is not limited to the padding block, which can be other forms of spacer.

Figure 3:
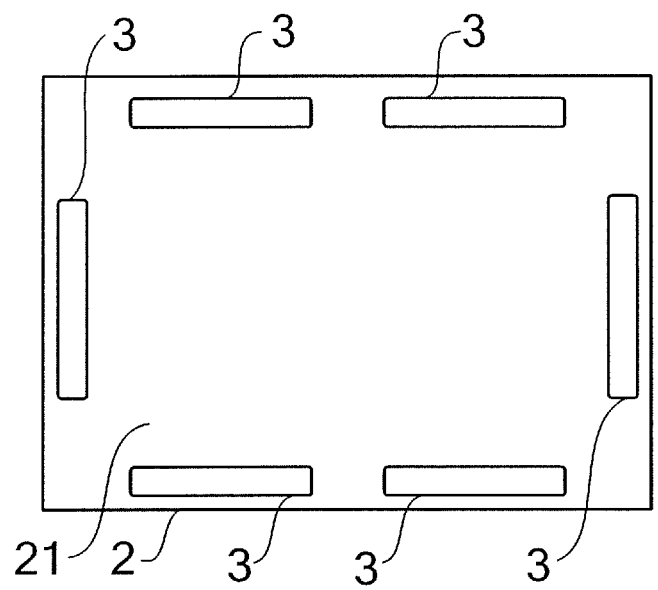
FIG. 3 shows a first arrangement mode of padding blocks according to an embodiment of the present disclosure.

Example I, see FIG. 3, a plurality of padding blocks 3 are arranged between the bottom surface of back plate 1 and the reflector plate 2, and the plurality of padding blocks 3 are spaced apart from each other and arranged in form of annular-like trajectory along the edge region of the first surface 21. In such design, when the above backlight module is vibrated, the vibration of the reflector plate 2 and the back plate 1 would impact the padding blocks 3, and the plurality of padding blocks 3 are subjected to stress together, then each padding block is subject to only a part of the stress, so it can reduce the interaction effect caused by the vibration of the reflector plate 2 and the back plate 1.

Figure 4:
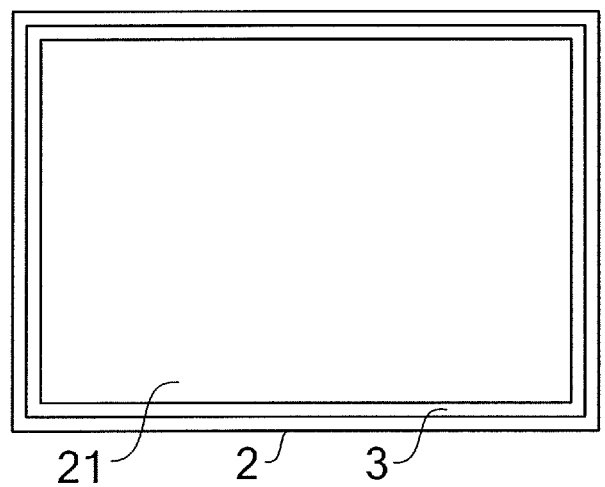
FIG. 4 shows a second arrangement mode of padding blocks according to an embodiment of the present disclosure.

Example II, see FIG. 4, an annular-like padding block 3 is arranged between the bottom surface of back plate 1 and the reflector plate 2, and the annular-like padding block 3 corresponds to the edge region of the first surface 21. The annular-like padding block 3 is an integral object, all the edge regions of the reflector plate 2 are supported by the annular-like padding block 3, so the annular-like padding block 3 can support the reflector plate 2 well, and it is easily installed. It is noted that the flat shape of the annular-like padding block 3 is selected based on the flat shape of the reflector plate 2 in the backlight module, and the annular-like padding block 3 may be a circular-like padding block or a polygonal shape padding block.

It is noted that the padding blocks 3 arranged according to the examples I and II can be used in a backlight module of small size. If a backlight module has a large size, it can use the following exemplary manner to arrange the padding block 3.

Figure 5:
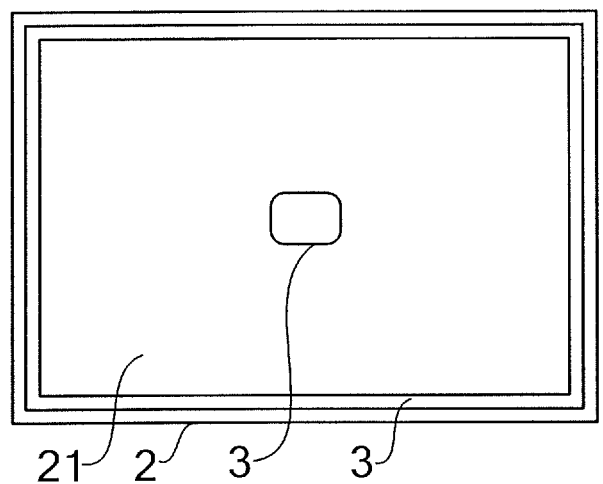
FIG. 5 shows a third arrangement mode of padding blocks according to an embodiment of the present disclosure.
Figure 6:
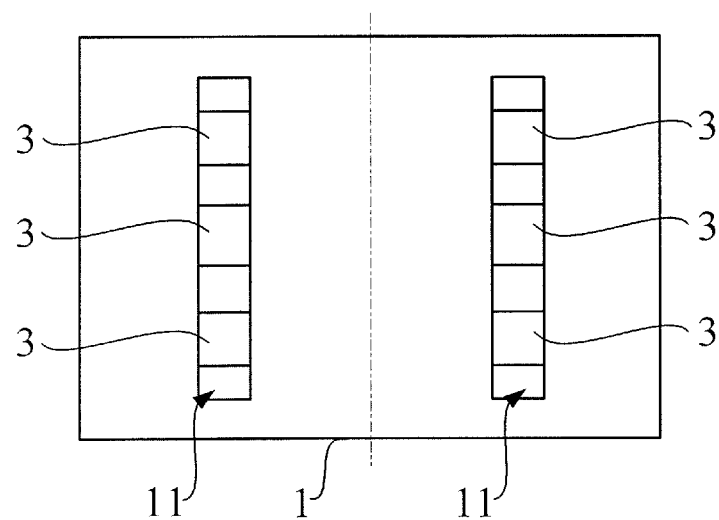
FIG. 6 shows a fourth arrangement mode of padding blocks according to an embodiment of the present disclosure.
Figure 7:
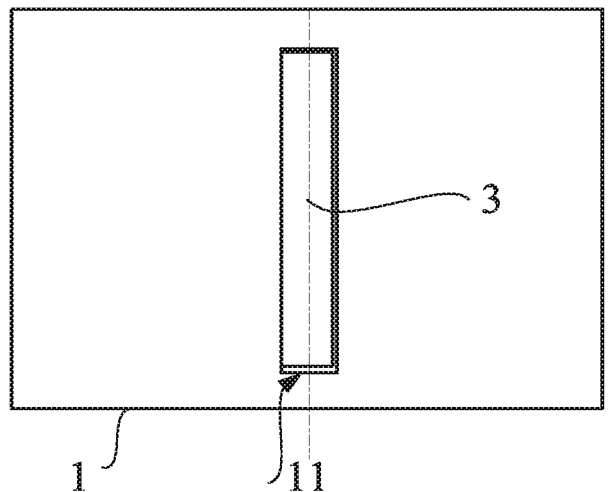
FIG. 7 shows a fifth arrangement mode of padding blocks according to an embodiment of the present disclosure.
Figure 8:
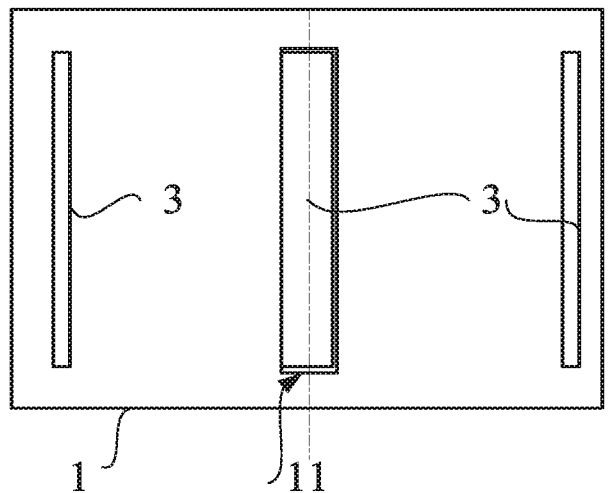
FIG. 8 shows a sixth arrangement mode of padding blocks according to an embodiment of the present disclosure.
Figure 9:
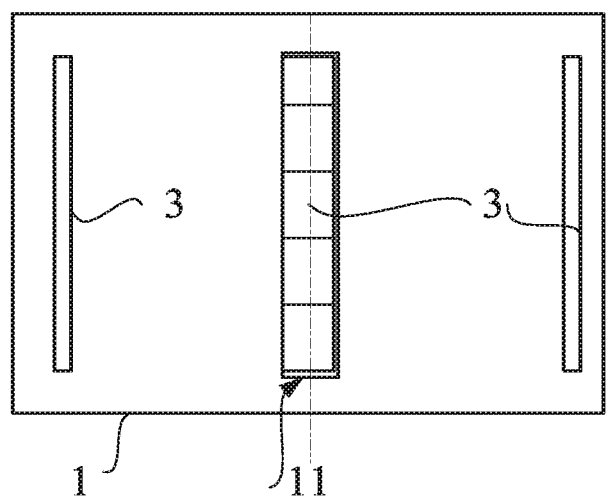
FIG. 9 shows a seventh arrangement mode of padding blocks according to an embodiment of the present disclosure.

Example III, see FIG. 5, a plurality of padding blocks 3 are arranged between the bottom surface of back plate 1 and the reflector plate 2, and at least one of the plurality of padding blocks 3 are arranged corresponding to the middle region of the first surface 21, and the rest of padding blocks 3 are arranged corresponding to the edge region of the first surface 21. The padding block 3 arranged corresponding to the middle region of the first surface 21 is configured to support the reflector plate 2, and prevent the reflector plate 2 from deforming towards to the bottom surface of the back plate 1, and to ensure the quality of the light emitted from the backlight module. For example, the padding block 3 arranged corresponding to the edge region of the first surface 21 may employ the arrangement modes according to the above example I or II. The number of the padding block 3 arranged corresponding to the middle region of the first surface 21 may be one or more. When one padding block 3 is arranged on the middle region of the first surface 21, the padding block 3 may has a variety of shapes, such as annular, tetragonum or the like. When a plurality of padding blocks 3 are arranged on the middle region of the first surface 21, the plurality of padding blocks 3 are arranged on the middle region of the first surface 21 and spaced apart from each other to form an annular-like shape. Furthermore, under the premise of ensuring the reflector plate 2 not being deformed towards to the bottom surface of the back plate 1, the area, of the reflector plate 2, contacting with the padding block 3 is reduced as far as possible, to reduce the possibility of the reflector plate 2 being scratched when the reflector plate 2 contacts with the padding block 3.

In the above embodiment, the padding block 3 is mainly arranged corresponding to the edge region of the first surface 21. If the bottom surface of the back plate 1 has a reinforcement rib groove 11 configured to reinforce strength of the bottom surface of the back plate 1, and an opening of the reinforcement rib groove 11 faces to the reflector plate 2, the padding block 3 may also be arranged in the following example.

Example IV to Example VII, see FIGS. 6-9, a plurality of padding blocks 3 are arranged between the bottom surface of back plate 1 and the reflector plate 2, and at least one of the padding blocks 3 are arranged in the reinforcement rib groove 11, and the rest of padding blocks 3 are arranged corresponding to the edge region of the first surface 21. In such design, since the bottom of the reinforcement rib groove 11 has a large spacing from the reflector plate 2, the padding block 3 arranged in the reinforcement rib groove 11 has a corresponding large thickness for keeping a certain spacing between the bottom surface of the back plate 1 and the reflector plate 2. When the above backlight module is vibrated, the padding block 3 can buffer the vibration of the reflector plate 2 and the back plate 1, achieving a damping effect. Furthermore, the reinforcement rib groove 11 can accommodate or fix the padding block 3 to prevent the padding block 3 from vibrating.

The number and shape of the reinforcement rib groove 11 arranged on the bottom surface of the back plate 1 can be in various manners, therefore, the arrangement of the padding block 3 is varied based on the number and shape of the reinforcement rib groove 11. For example, see FIG. 6, when the bottom surface of the back plate 1 has two reinforcement rib grooves 11, the two reinforcement rib grooves 11 are parallel to each other and the two reinforcement rib grooves 11 are symmetrically arranged along the center line of the bottom surface of the back plate 1, the plurality of padding blocks 3 are evenly arranged in the two reinforcement rib grooves 11 so that each of padding blocks 3 is subjected to same stress to optimize the buffer effect. The number and shape of the reinforcement rib groove 11 includes but not limited to the above examples. For example, when one annular reinforcement rib groove 11 is arranged in the bottom surface of the back plate 1, and the annular-like reinforcement rib groove 11 is arranged on the edge region of the bottom surface of the back plate 1, the plurality of padding blocks 3 may be evenly arranged in the reinforcement rib groove 11. When a strip reinforcement rib groove 11 is arranged the bottom surface of the back plate 1, and the strip reinforcement rib groove 11 is arranged on the center line of the bottom surface of the back plate 1, at least one padding blocks 3 is arranged in the strip reinforcement rib groove 11, and a plurality of padding blocks 3 can be correspondingly arranged on the edge region of the first surface 21. When a plurality of strip or arc reinforcement rib grooves 11 are evenly arranged on the bottom surface of the back plate 1, they may be arranged based on actual requirements so that a certain spacing is kept between the bottom surface of the back plate 1 and the reflector plate 2 and the reflector plate 2 is kept in balance.

In the backlight module provided by the above embodiments, the padding block 3 can be a rigid padding block, such as a metal padding block, and the padding block 3 also can be an elastic padding block. For example, the padding block 3 is an elastic padding block. In such design, when the above backlight module is vibrated, the elastic padding block 3 may reduce the interaction effect caused by the vibration of the reflector plate 2 and the back plate 1 in the backlight module, and improve the buffer and damping effect.

In the backlight module provided by the above embodiments, a spacer (e.g. at least one padding block 3) is arranged between the bottom surface of the back plate 1 and the reflector plate 2 for keeping a certain spacing between the bottom surface of the back plate 1 and the reflector plate 2, so as to prevent the bottom surface of the back plate 1 from contacting with the reflector plate 2. By multiple tests for the above backlight module, the minimum spacing between the bottom surface of the back plate 1 and the reflector plate 2 may be 0.6 mm for preventing the bottom surface of the back plate 1 from contacting with the reflector plate 2. Therefore, see FIG. 2 again, in the backlight module provided by the above embodiments, the spacing h between the bottom surface of the back plate 1 and the reflector plate 2 is larger than 0.6 mm (h≥0.66 mm). In such design, it may prevent the bottom surface of the back plate 1 from contacting with the reflector plate 2, reducing the possibility of the reflector plate 2 being scratched, and improving the quality of light emitted from the backlight module.

The embodiment of the present disclosure further provides a display device. The display device includes the backlight module provided by the above embodiments. The display device has same advantage with the backlight module provided by the above embodiments, which is not repeated herein. Since the backlight module is used to provide backlight, and it can substantially improve the quality of the emitted light, it can substantially improve the display quality of the display device.

The display device may include any product or component having display function, such as a liquid crystal display device, an electronic paper, a mobile phone, a tablet personal computer, a television, a notebook computer, a digital photo frame, a navigator.

In the description of above embodiments, specific feature, structure, material or characteristics may be combined in a suitable manner in any of one or more embodiments or examples.

In the backlight module provided by the above embodiments, a spacer is arranged between the bottom surface of the back plate and the reflector plate for keeping a certain spacing between the bottom surface of the back plate and the reflector plate. In such design, when the above backlight module is vibrated, it prevents the reflector plate from contacting with the bottom surface of the back plate, so it would not produce mutual friction between the reflector plate and the bottom surface of the back plate, so as to reduce the possibility of the reflector plate being scratched so that the quality of light emitted from the backlight module is improved, and the display quality of the display device is improved.

The described above are only illustrative embodiments and implementations for explaining the present disclosure, and the present disclosure is not intended to limited thereto. For one of ordinary skill in the art, various modifications and improvements may be made without departing from the spirit and scope of embodiments of the present disclosure, and all of equivalent solutions should fall within the protection scope of the present disclosure.

The present application claims priority of Chinese patent application No. 201520094859.3 filed on Feb. 10, 2015 and entitled "BACKLIGHT MODULE AND DISPLAY DEVICE", the contents of which are incorporated herein by reference.

What is claimed is:

1. A backlight module comprising:
   a back plate;
   a reflector plate provided on a bottom surface of the back plate; and
   a spacer provided between the bottom surface of the back plate and the reflector plate and configured to keep a certain spacing between the bottom surface of the back plate and the reflector plate;
   wherein the spacer comprises a plurality of padding blocks, the bottom surface of the back plate is recessed toward a direction away from the reflector plate to form two reinforcement rib grooves, the two reinforcement rib grooves being symmetrically provided along a center line of the bottom surface of the back plate and configured to receive all of the plurality of padding blocks evenly distributed therein to reinforce strength of the bottom surface of the back plate.

2. The backlight module according to claim 1, wherein the reflector plate includes a first surface and a second surface, and the spacer corresponds to an edge region of the first surface of the reflector plate, and the first surface is a surface, of the reflector plate, facing the bottom surface of the back plate.

3. The backlight module according to claim 1, wherein the padding blocks are elastic padding blocks.

4. The backlight module according to claim 1, wherein the spacing between the bottom surface of the back plate and the reflector plate is larger than or equal to 0.6 mm.

5. The backlight module according to claim 1, wherein an opening of the reinforcement rib groove faces to the reflector plate.

6. The backlight module according to claim 2, wherein others of the plurality of padding blocks are spaced apart and provided in form of annular-like trajectory along the edge region of the first surface.

7. The backlight module according to claim 2, wherein the spacer is annular-like, or arranged in annular-like shape corresponding to the edge region of the first surface, and is received in the reinforcement rib groove in an annular-like shape arranged on the edge region of the first surface.

8. The backlight module according to claim 2, where at least another one of the plurality of padding blocks are provided corresponding to a middle region of the first surface.

9. A display device, comprising a backlight module, wherein the backlight module comprises:
   a back plate;
   a reflector plate provided on a bottom surface of the back plate; and
   a spacer provided between the bottom surface of the back plate and the reflector plate and configured to keep a spacing between the bottom surface of the back plate and the reflector plate;
   wherein the spacer comprises a plurality of padding blocks, the bottom surface of the back plate is recessed toward a direction away from the reflector plate to form two reinforcement rib grooves, the two reinforcement rib grooves being symmetrically provided along a center line of the bottom surface of the back plate and configured to receive all of the plurality of padding blocks evenly distributed therein to reinforce strength of the bottom surface of the back plate.

10. The display device according to claim 9, wherein the reflector plate includes a first surface and a second surface, and the spacer corresponds to an edge region of the first surface of the reflector plate, and the first surface is a surface, of the reflector plate, facing the bottom surface of the back plate.

11. The display device according to claim 9, wherein the padding blocks are elastic padding blocks.

12. The display device according to claim 9, wherein the spacing between the bottom surface of the back plate and the reflector plate is larger than or equal to 0.6 mm.

13. The display device according to claim 10, wherein others of the plurality of padding blocks are spaced apart and provided in a form of annular-like trajectory along the edge region of the first surface.

14. The display device according to claim 10, wherein the spacer is annular-like, or arranged in annular-like shape corresponding to the edge region of the first surface, and is received in the reinforcement rib groove in an annular-like shape arranged on the edge region of the first surface.

15. The display device according to claim 10, where at least another one of the plurality of padding blocks are provided corresponding to a middle region of the first surface.

* * * * *